United States Patent
Ibrahim

(10) Patent No.: US 9,278,758 B2
(45) Date of Patent: Mar. 8, 2016

(54) SELF-CONFIGURING CABIN MANAGEMENT SYSTEM

(75) Inventor: Yakentim Mela Ibrahim, Brier, WA (US)

(73) Assignee: The Boeing Company, Chicago, IL (US)

( * ) Notice: Subject to any disclaimer, the term of this patent is extended or adjusted under 35 U.S.C. 154(b) by 486 days.

(21) Appl. No.: 13/274,147

(22) Filed: Oct. 14, 2011

(65) Prior Publication Data
US 2013/0096772 A1  Apr. 18, 2013

(51) Int. Cl.
*G06F 19/00* (2011.01)
*B64D 11/00* (2006.01)

(52) U.S. Cl.
CPC . *B64D 11/00* (2013.01); *Y02T 50/46* (2013.01)

(58) Field of Classification Search
CPC .... B64D 11/00; B64D 11/06; B64D 11/0624; B64D 11/0626; B64D 2011/0038; B64D 2011/0053
USPC .......................................................... 701/36
See application file for complete search history.

(56) References Cited

U.S. PATENT DOCUMENTS

2005/0273823 A1* 12/2005 Brady et al. .................... 725/76
2008/0080197 A1*  4/2008 Heine et al. ................. 362/471

OTHER PUBLICATIONS

Custom Control Concepts, Inc.; Cabin Management Systems © 2011; http://custom-control.com/cabin_management_systems.htm.
Gulfstream Aerospace Corporation; "G280 Cabin Management System" © 2011; http://www.gulfstream.com/products/g280/cabin-management-system.htm.
Rockwell Collins; "Cabin Management System" © 2011; http://www.rockwellcollins.com/sitecore/content/Data/Products/Cabin/Cabin_Mgmt_Systems/Cabin_Management_System.aspx.

* cited by examiner

*Primary Examiner* — Mussa A Shaawat
*Assistant Examiner* — Kyung Kim

(57) ABSTRACT

A passenger cabin system includes a plurality of passenger control units, a plurality of passenger service units, and a programming code. The programming code is stored on a computer readable medium for dynamically linking each of the passenger control units to a separate one of the passenger service units.

31 Claims, 7 Drawing Sheets

SELF-CONFIGURING CABIN MANAGEMENT SYSTEM

FIELD OF THE DISCLOSURE

The disclosure relates to a self-configuring cabin management system which may be used in a passenger cabin of a vehicle.

BACKGROUND OF THE DISCLOSURE

Cabin management systems on aircraft and other passenger vehicles typically use static databases to map cabin and seat controls to corresponding controller functions per the layout of the passenger area (LOPA). Typically, a custom database, which is specific to the given vehicle layout, is manually generated by a database generator for the cabin management system, and a corresponding overhead is required to generate, maintain, and deploy the database. Also, an in-flight-entertainment system is typically used to provide communication between passenger seat controls and overhead units. Some of the drawbacks associated with typical cabin management systems include the following: they often require a database generator to produce a specific database for the vehicle layout; they often require time to generate the database; they often require a configuration management system to track revisions of the database; they often require a mechanism to deploy the database; they often require in-flight-entertainment systems to route messages to the cabin management system; they often require an overhead associated with mapping in-flight-entertainment and cabin management system functions; they often require a great deal of weight; and they often are overly expensive and complex.

A system and method is needed to overcome one or more issues of one or more of the existing cabin management systems and methods.

SUMMARY OF THE DISCLOSURE

In one embodiment, a passenger cabin system is disclosed. The passenger cabin comprises a plurality of passenger control units, a plurality of passenger service units, and a programming code, stored on a computer readable medium, for dynamically linking each of the passenger control units to a separate one of the passenger service units.

In another embodiment, a vehicle is disclosed. The vehicle comprises at least one column, a plurality of passenger control units, a plurality of passenger service units, and a programming code. The at least one column comprises a plurality of rows, with each of the rows comprising at least one seat. Each seat of each row is associated with a separate one of the passenger control units. Each of the rows is associated with a separate one of the passenger service units. The programming code is stored on a computer readable medium for dynamically linking each of the passenger control units to a separate one of the passenger service units.

In an additional embodiment, a method of managing a passenger cabin is disclosed. In one step, a plurality of passenger control units, a plurality of passenger service units, and a programming code, stored on a computer readable medium, are provided. In another step, each of the passenger control units is dynamically linked, with the programming code, to a separate one of the passenger service units.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
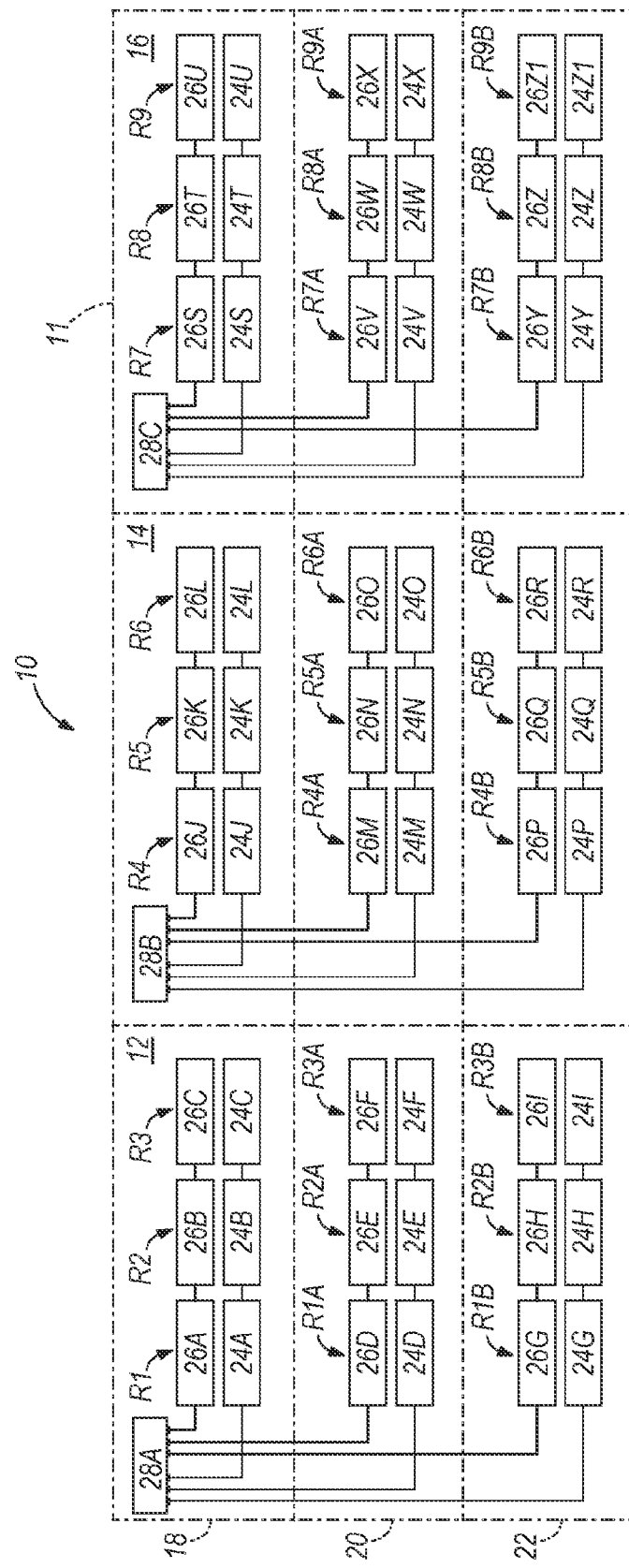
FIG. 1 is a box diagram illustrating one embodiment of a system.

FIG. 1 is a box diagram illustrating one embodiment of a system 10. The system 10 may comprise a passenger cabin system of a vehicle 11 such as an aircraft, train, bus or other types of vehicles which transport passengers. The system 10 comprises zones 12, 14, and 16. The zones 12, 14, and 16 comprise different seating areas of the system 10. In one embodiment, zone 12 comprises a first class seating area, zone 14 comprises a business class seating area, and zone 16 comprises an economy seating area. In another embodiment, there are in a range of 1 to 5 zones. In other embodiments, there may be any number of zones representing different seating areas of the system 10. The system 10 comprises columns 18, 20, and 22 which are disposed in each of zones 12, 14, and 16. Column 18 comprises rows R1, R2, R3, R4, R5, R6, R7, R8, and R9, with each of the rows comprising one passenger seat. Column 20 comprises rows R1A, R2A, R3A, R4A, R5A, R6A, R7A, R8A, and R9A, with each of the rows comprising one passenger seat. Column 22 comprises rows R1B, R2B, R3B, R4B, R5B, R6B, R7B, R8B, and R9B, with each of the rows comprising one passenger seat. In another embodiment, there may be in a range of 1 to 10 columns each having in a range of 1 to 100 rows each having in a range of 1 to 100 passenger seats. In other embodiments, there may be a varying number of columns having a varying number of rows having a varying number of passenger seats.

Zone 12 comprises passenger control units 24A, 24B, and 24C in column 18, passenger control units 24D, 24E, and 24F in column 20, and passenger control units 24G, 24H, and 24I in column 22. For purposes of this disclosure, the term "passenger control unit" is defined as a controller device which allows a passenger to input a command: "the passenger control units" include passenger controls for controlling the passenger service units. The passenger control units of the disclosure may comprise buttons, touch-pads, switches, assistance call controls, light controls, reading light controls, call-light controls, fan controls, air controls, or other types of passenger control units. The passenger control units of the disclosure may further comprise micro-controllers having memory, processing capability, and input and output capabilities. Passenger control units 24A, 24B, and 24C are each separately associated with a separate passenger seat of the separate respective rows R1, R2, and R3 and communicate with one another. For purposes of this disclosure, the word "communicate" is defined as the conveying of information and can be done using a wide variety of communication devices and methods such as wireless (i.e. 802.11, Bluetooth, Zigbee, etc.), serial (i.e. RS-232, etc.), optical (i.e. Infrared, etc.), multi-drop (i.e. CAN Bus, RS-845, etc.), and other types of communication devices and methods. Passenger control units 24D, 24E, and 24F are each separately associated with a separate passenger seat of the separate respective rows R1A, R2A, and R3A and communicate with one another. Passenger control units 24G, 24H, and 24I are each separately associated with a separate passenger seat of the separate respective rows R1B, R2B, and R3B and communicate with one another.

Zone 12 further comprises passenger service units 26A, 26B, and 26C in column 18, passenger service units 26D, 26E, and 26F in column 20, and passenger service units 26G, 26H, and 26I in column 22. For purposes of this disclosure, the term "passenger service unit" is defined as an output device which performs a function associated with the command inputted by the passenger using the "passenger control unit" to allow the passenger to control the "passenger service unit" using the associated "passenger control unit". The passenger service units of the disclosure may comprise lights, reading lights, call-lights, displays, fans, air devices, or another type of user-controlled functions/devices which may be located over the passenger's head or in other locations. The passenger service units of the disclosure may further comprise micro-controllers having memory, processing capability, and input and output capabilities. Passenger service units 26A, 26B, and 26C are each separately associated with a separate respective row R1, R2, and R3 and communicate with one another. Passenger service units 26D, 26E, and 26F are each separately associated with a separate respective row R1A, R2A, and R3A and communicate with one another. Passenger service units 26G, 26H, and 26I are each separately associated with a separate respective row R1B, R2B, and R3B and communicate with one another.

Zone 12 additionally comprises cabin management unit 28A. For purposes of the disclosure, the term "cabin management unit" is defined as a device for managing a passenger cabin such as a micro-controller having memory, processing capability, and input and output capabilities. Cabin management unit 28A communicates with and between passenger control unit 24A and passenger service unit 26A. Using programming code stored on a computer readable medium, the cabin management unit 28A does each of the following functions: dynamically, in real-time, determines how many passenger control units 24A, 24B, and 24C are disposed in column 18 of zone 12; dynamically, in real-time, determines how many passenger service units 26A, 26B, and 26C are disposed in column 18 of zone 12; and creates a dynamic database, in real-time, linking each of the passenger control units 24A, 24B, and 24C to a separate respective passenger service unit 26A, 26B, and 26C. In such manner, the cabin management unit 28A creates a dynamic, real-time database which allows passenger control unit 24A to control passenger service unit 26A, which allows passenger control unit 24B to control passenger service unit 26B, and which allows passenger control unit 24C to control passenger service unit 26C.

Cabin management unit 28A also communicates with and between passenger control unit 24D and passenger service unit 26D. Using programming code stored on a computer readable medium, the cabin management unit 28A does each of the following functions: dynamically, in real-time, determines how many passenger control units 24D, 24E, and 24F are disposed in column 20 of zone 12; dynamically, in real-time, determines how many passenger service units 26D, 26E, and 26F are disposed in column 20 of zone 12; and creates a dynamic database, in real-time, linking each of the passenger control units 24D, 24E, and 24F to a separate respective passenger service unit 26D, 26E, and 26F. In such manner, the cabin management unit 28A creates a dynamic, real-time database which allows passenger control unit 24D to control passenger service unit 26D, which allows passenger control unit 24E to control passenger service unit 26E, and which allows passenger control unit 24F to control passenger service unit 26F.

Cabin management unit 28A further communicates with and between passenger control unit 24G and passenger service unit 26G. Using programming code stored on a computer readable medium, the cabin management unit 28A does each of the following functions: dynamically, in real-time, determines how many passenger control units 24G, 24H, and 24I are disposed in column 22 of zone 12; dynamically, in real-time, determines how many passenger service units 26G, 26H, and 26I are disposed in column 22 of zone 12; and creates a dynamic database, in real-time, linking each of the passenger control units 24G, 24H, and 24I to a separate respective passenger service unit 26G, 26H, and 26I. In such manner, the cabin management unit 28A creates a dynamic, real-time database which allows passenger control unit 24G to control passenger service unit 26G, which allows passenger control unit 24H to control passenger service unit 26H, and which allows passenger control unit 24I to control passenger service unit 26I.

Zone 14 comprises passenger control units 24J, 24K, and 24L in column 18, passenger control units 24M, 24N, and 24O in column 20, and passenger control units 24P, 24Q, and 24R in column 22. Passenger control units 24J, 24K, and 24L are each separately associated with a separate passenger seat of the separate respective rows R4, R5, and R6 and communicate with one another. Passenger control units 24M, 24N, and 24O are each separately associated with a separate passenger seat of the separate respective rows R4A, R5A, and R6A and communicate with one another. Passenger control units 24P, 24Q, and 24R are each separately associated with a separate passenger seat of the separate respective rows R4B, R5B, and R6B and communicate with one another.

Zone 14 further comprises passenger service units 26J, 26K, and 26L in column 18, passenger service units 26M, 26N, and 26O in column 20, and passenger service units 26P, 26Q, and 26R in column 22. Passenger service units 26J, 26K, and 26L are each separately associated with a separate respective row R4, R5, and R6 and communicate with one another. Passenger service units 26M, 26N, and 26O are each separately associated with a separate respective row R4A, R5A, and R6A and communicate with one another. Passenger service units 26P, 26Q, and 26R are each separately associated with a separate respective row R4B, R5B, and R6B and communicate with one another.

Zone 14 additionally comprises cabin management unit 28B. Cabin management unit 28B communicates with and between passenger control unit 24J and passenger service unit 26J. Using programming code stored on a computer readable medium, the cabin management unit 28B does each of the following functions: dynamically, in real-time, determines how many passenger control units 24J, 24K, and 24L are disposed in column 18 of zone 14; dynamically, in real-time, determines how many passenger service units 26J, 26K, and 26L are disposed in column 18 of zone 14; and creates a dynamic database, in real-time, linking each of the passenger control units 24J, 24K, and 24L to a separate respective passenger service unit 26J, 26K, and 26L. In such manner, the cabin management unit 28B creates a dynamic, real-time database which allows passenger control unit 24J to control passenger service unit 26J, which allows passenger control unit 24K to control passenger service unit 26K, and which allows passenger control unit 24L to control passenger service unit 26L.

Cabin management unit 28B also communicates with and between passenger control unit 24M and passenger service unit 26M. Using programming code stored on a computer readable medium, the cabin management unit 28B does each of the following functions: dynamically, in real-time, determines how many passenger control units 24M, 24N, and 24O are disposed in column 20 of zone 14; dynamically, in real-time, determines how many passenger service units 26M, 26N, and 26O are disposed in column 20 of zone 14; and creates a dynamic database, in real-time, linking each of the passenger control units 24M, 24N, and 24O to a separate respective passenger service unit 26M, 26N, and 26O. In such manner, the cabin management unit 28B creates a dynamic, real-time database which allows passenger control unit 24M to control passenger service unit 26M, which allows passenger control unit 24N to control passenger service unit 26N, and which allows passenger control unit 24O to control passenger service unit 26O.

Cabin management unit 28B further communicates with and between passenger control unit 24P and passenger service unit 26P. Using programming code stored on a computer readable medium, the cabin management unit 28B does each of the following functions: dynamically, in real-time, determines how many passenger control units 24P, 24Q, and 24R are disposed in column 22 of zone 14; dynamically, in real-time, determines how many passenger service units 26P, 26Q, and 26R are disposed in column 22 of zone 14; and creates a dynamic database, in real-time, linking each of the passenger control units 24P, 24Q, and 24R to a separate respective passenger service unit 26P, 26Q, and 26R. In such manner, the cabin management unit 28B creates a dynamic, real-time database which allows passenger control unit 24P to control passenger service unit 26P, which allows passenger control unit 24Q to control passenger service unit 26Q, and which allows passenger control unit 24R to control passenger service unit 26R.

Zone 16 comprises passenger control units 24S, 24T, and 24U in column 18, passenger control units 24V, 24W, and 24X in column 20, and passenger control units 24Y, 24Z, and 24Z1 in column 22. Passenger control units 24S, 24T, and 24U are each separately associated with a separate passenger seat of the separate respective rows R7, R8, and R9, and communicate with one another. Passenger control units 24V, 24W, and 24X are each separately associated with a separate respective row R7A, R8A, and R9A, and communicate with one another. Passenger control units 24Y, 24Z, and 24Z1 are each separately associated with a separate respective row R7B, R8B, and R9B, and communicate with one another.

Zone 16 further comprises passenger service units 26S, 26T, and 26U in column 18, passenger service units 26V, 26W, and 26X in column 20, and passenger service units 26Y, 26Z, and 26Z1 in column 22. Passenger service units 26S, 26T, and 26U are each separately associated with a separate respective row R7, R8, and R9, and communicate with one another. Passenger service units 26V, 26W, and 26X are each separately associated with a separate respective row R7A, R8A, and R9A, and communicate with one another. Passenger service units 26Y, 26Z, and 26Z1 are each separately associated with a separate respective row R7B, R8B, and R9B, and communicate with one another.

Zone 16 additionally comprises cabin management unit 28C. Cabin management unit 28C communicates with and between passenger control unit 24S and passenger service unit 26S. Using programming code stored on a computer readable medium, the cabin management unit 28C does each of the following functions: dynamically, in real-time, determines how many passenger control units 24S, 24T, and 24U are disposed in column 18 of zone 16; dynamically, in real-time, determines how many passenger service units 26S, 26T, and 26U are disposed in column 18 of zone 16; and creates a dynamic database, in real-time, linking each of the passenger control units 24S, 24T, and 24U to a separate respective passenger service unit 26S, 26T, and 26U. In such manner, the cabin management unit 28C creates a dynamic, real-time database which allows passenger control unit 24S to control passenger service unit 26S, which allows passenger control unit 24T to control passenger service unit 26T, and which allows passenger control unit 24U to control passenger service unit 26U.

Cabin management unit 28C also communicates with and between passenger control unit 24V and passenger service unit 26V. Using programming code stored on a computer readable medium, the cabin management unit 28C does each of the following functions: dynamically, in real-time, determines how many passenger control units 24V, 24W, and 24X are disposed in column 20 of zone 16; dynamically, in real-time, determines how many passenger service units 26V, 26W, and 26X are disposed in column 20 of zone 16; and creates a dynamic database, in real-time, linking each of the passenger control units 24V, 24W, and 24X to a separate respective passenger service unit 26V, 26W, and 26X. In such manner, the cabin management unit 28C creates a dynamic, real-time database which allows passenger control unit 24V to control passenger service unit 26V, which allows passenger control unit 24W to control passenger service unit 26W, and which allows passenger control unit 24X to control passenger service unit 26X.

Cabin management unit 28C further communicates with and between passenger control unit 24Y and passenger service unit 26Y. Using programming code stored on a computer readable medium, the cabin management unit 28C does each of the following functions: dynamically, in real-time, determines how many passenger control units 24Y, 24Z, and 24Z1 are disposed in column 22 of zone 16; dynamically, in real-time, determines how many passenger service units 26Y, 26Z, and 26Z1 are disposed in column 22 of zone 16; and creates a dynamic database, in real-time, linking each of the passenger control units 24Y, 24Z, and 24Z1 to a separate respective passenger service unit 26Y, 26Z, and 26Z1. In such manner, the cabin management unit 28C creates a dynamic, real-time database which allows passenger control unit 24Y to control passenger service unit 26Y, which allows passenger control unit 24Z to control passenger service unit 26Z, and which allows passenger control unit 24Z1 to control passenger service unit 26Z1.

The system 10, as discussed above, is a self-configuring, dynamic system that links passenger control units to passenger service units, allowing passengers to control the functions of the passenger service units with the associated passenger control units, without requiring a custom, static database for the passenger cabin, such as a pre-configured specific layout of a passenger area (LOPA) for the linkage. This eliminates the need for a custom database to be manually generated using a CMS database generator for a cabin management system, and eliminates the need for a corresponding overhead typically required to generate, maintain, and deploy the database. It also eliminates the need for an in-flight-entertainment system (IFE) to be present for communication to take place between passenger control units and passenger service units. The system 10 saves time because a database does not have to be pre-generated, and saves money because a configuration management system is not needed to track revisions of the database, and a mechanism to deploy the database is not needed. Furthermore, the system 10 saves more weight than typical systems, allowing for cost savings in fuel for vehicles implementing the system.

In other embodiments, a varying number of passenger control units, passenger service units, and cabin management units may be used to communicate with one another using varying arrangements, systems, and devices to create a dynamic, real-time database which allows passenger control units to control their associated passenger service units. In additional embodiments, other types of systems or devices may be in communication with the system 10.

Figure 2:
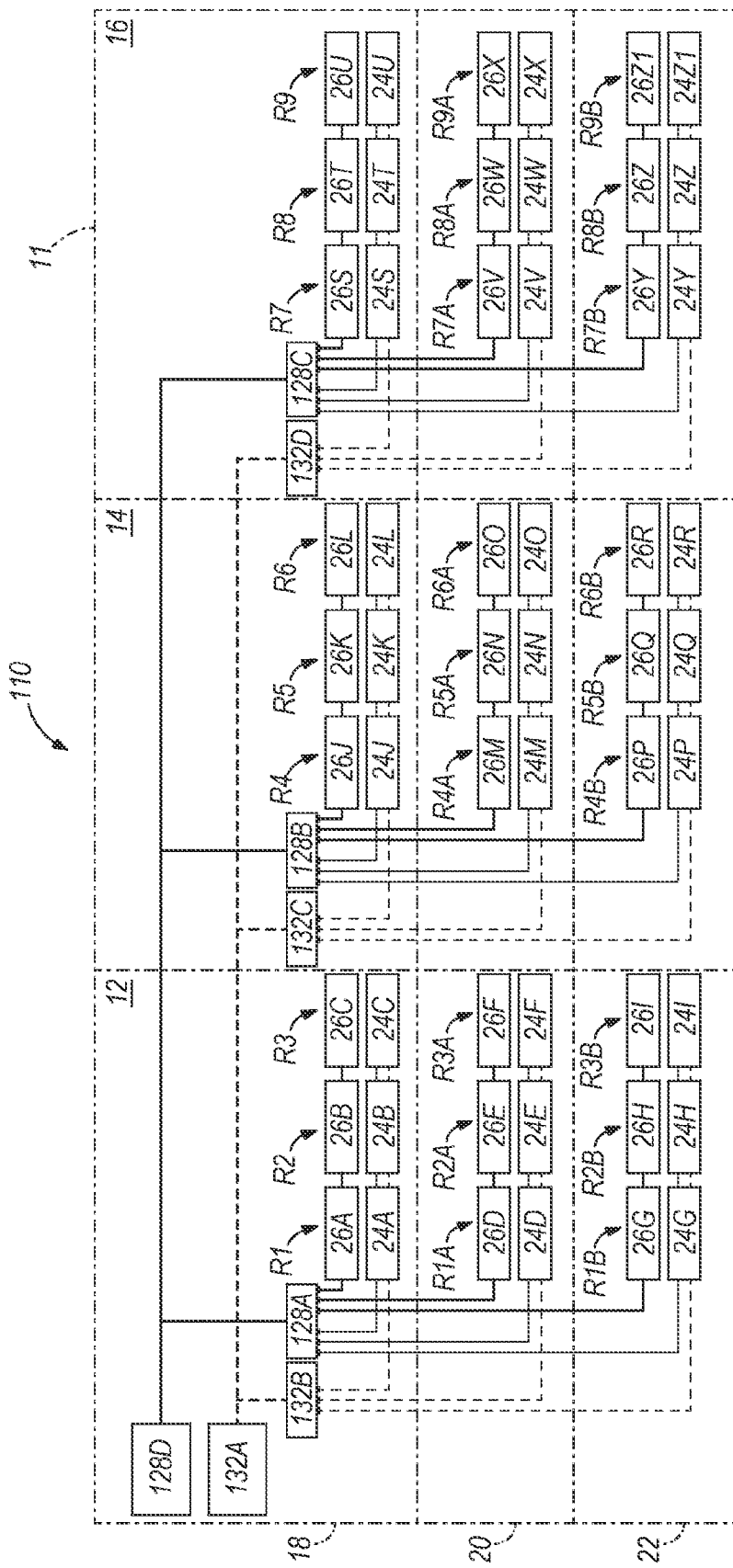
FIG. 2 is a box diagram illustrating another embodiment of a system.

FIG. 2 is a box diagram illustrating another embodiment of a system 110. The system 110 is identical to the system 10 of the embodiment of FIG. 1 in all respects with the exception of the following: the system 110 additionally includes an external head-end cabin management unit 128D, an external head-end in-flight-entertainment (IFE) unit 132A, and internal in-flight-entertainment (IFE) units 132B, 132C, and 132D; the cabin management units 128A, 128B, and 128C communicate with one another, and also communicate with the external head-end cabin management unit 128D; and the additional internal in-flight-entertainment units 132B, 132C, and 132D communicate with one another, communicate with the additional external head-end in-flight entertainment unit 132A, and communicate with the passenger control units 24A, 24D, 24G, 24J, 24M, 24P, 24S, 24V, and 24Y. The system 110 creates a dynamic, real-time database, which allows passenger control units to control their associated passenger service units, in the same manner as the system 10 of FIG. 1 without using or needing the external head-end cabin management unit 128D, the external head-end in-flight entertainment unit 132A, or the internal in-flight-entertainment units 132B, 132C, and 132D. In additional embodiments, other types of systems or devices may be in communication with the system 110. In additional embodiments, cabin management unit 128D could be implemented to execute the logic and dynamic database generation for pairing passenger control units to passenger service units handled in the previous example by 128A, 128B, and 128C.

Figure 3:
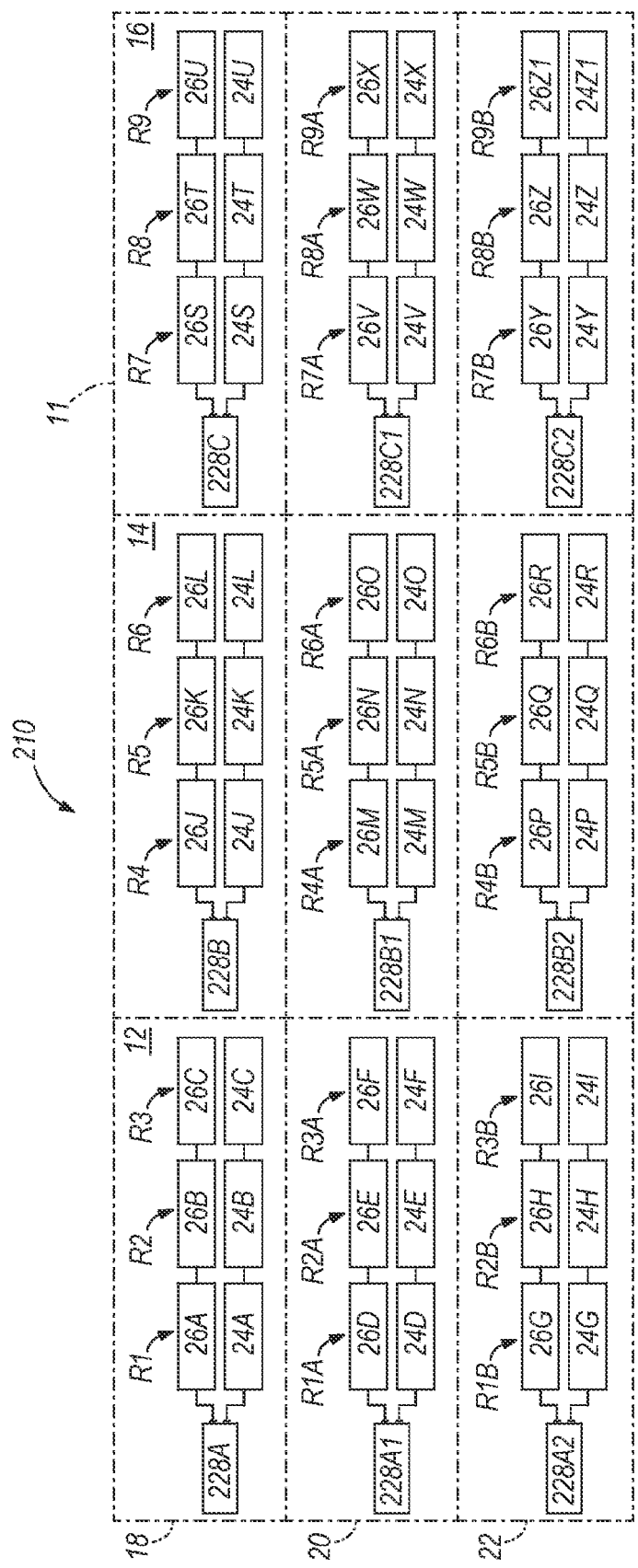
FIG. 3 is a box diagram illustrating yet another embodiment of a system.

FIG. 3 is a box diagram illustrating another embodiment of a system 210. The system 210 is identical to the system 10 of the embodiment of FIG. 1 in all respects with the exception of the following: each of the respective zones 12, 14, and 16 have three respective cabin management units 228A, 228A1, 228A2 (for zone 12), 228B, 228B1, 228B2 (for zone 14), and 228C, 228C1, and 228C2 (for zone 16); and each of the cabin management units 228A, 228A1, 228A2, 228B, 228B1, 228B2, and 228C, 228C1, and 228C2 only separately communicate with the passenger control units and passenger service units in one of columns 18, 20, and 22 in one of zones 12, 14, and 16 to dynamically make their linkage to allow the passenger control units to control their respective passenger service units.

For instance, cabin management unit 228A dynamically links passenger control unit 24A to passenger service unit 26A, passenger control unit 24B to passenger service unit 26B, and passenger control unit 24C to passenger service unit 26C. Cabin management unit 228A1 dynamically links passenger control unit 24D to passenger service unit 26D, passenger control unit 24E to passenger service unit 26E, and passenger control unit 24F to passenger service unit 26F. Cabin management unit 228A2 dynamically links passenger control unit 24G to passenger service unit 26G, passenger control unit 24H to passenger service unit 26H, and passenger control unit 24I to passenger service unit 26I. Cabin management unit 228B dynamically links passenger control unit 24J to passenger service unit 26J, passenger control unit 24K to passenger service unit 26K, and passenger control unit 24L to passenger service unit 26L. Cabin management unit 228B1 dynamically links passenger control unit 24M to passenger service unit 26M, passenger control unit 24N to passenger service unit 26N, and passenger control unit 24O to passenger service unit 26O. Cabin management unit 228B2 dynamically links passenger control unit 24P to passenger service unit 26P, passenger control unit 24Q to passenger service unit 26Q, and passenger control unit 24R to passenger service unit 26R. Cabin management unit 228C dynamically links passenger control unit 24S to passenger service unit 26S, passenger control unit 24T to passenger service unit 26T, and passenger control unit 24U to passenger service unit 26U. Cabin management unit 228C1 dynamically links passenger control unit 24V to passenger service unit 26V, passenger control unit 24W to passenger service unit 26W, and passenger control unit 24X to passenger service unit 26X. Cabin management unit 228C2 dynamically links passenger control unit 24Y to passenger service unit 26Y, passenger control unit 24Z to passenger service unit 26Z, and passenger control unit 24Z1 to passenger service unit 26Z1.

In other embodiments, a varying number of cabin management units, a varying number of passenger control units, and a varying number of passenger service units may be used to dynamically link each passenger control unit to a separate passenger control unit using varying communication configurations. In additional embodiments, other types of systems or devices may be in communication with the system 210.

Figure 4:
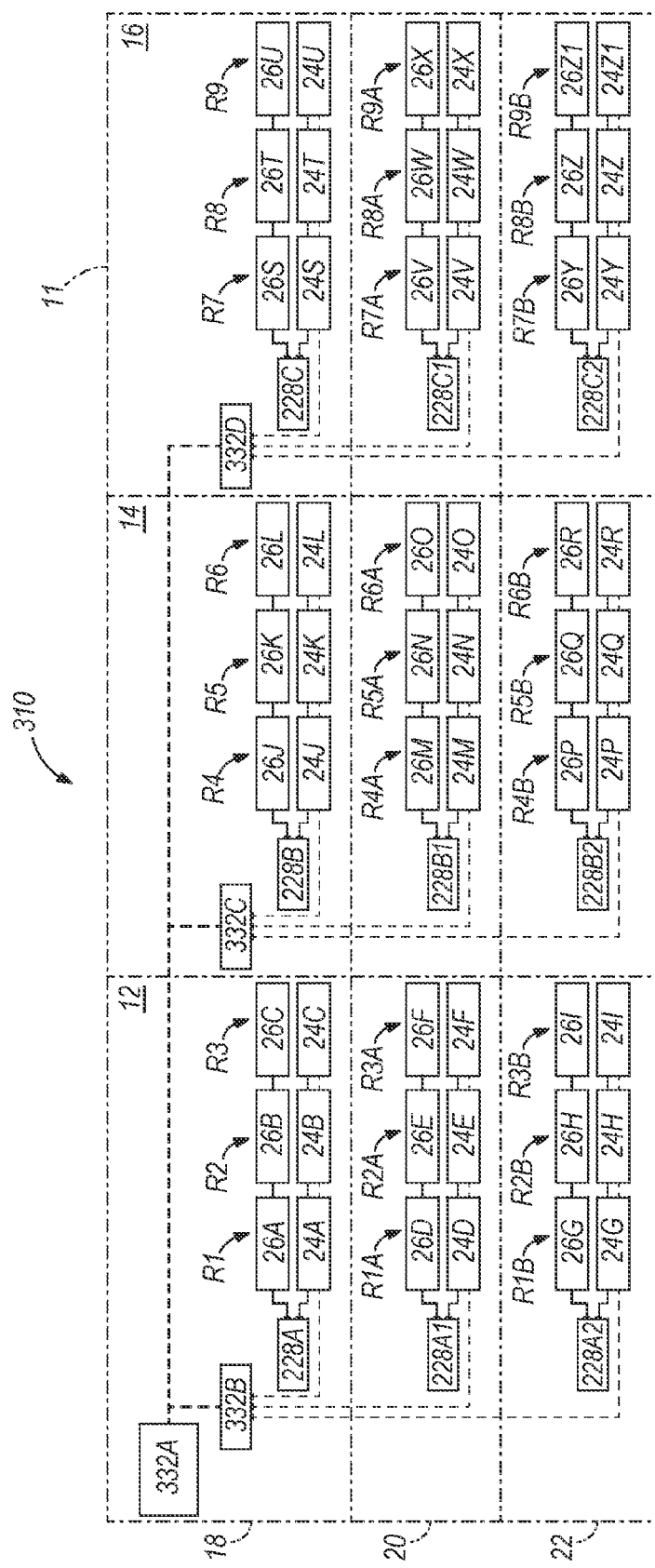
FIG. 4 is a box diagram illustrating still another embodiment of a system.

FIG. 4 is a box diagram illustrating another embodiment of a system 310. The system 310 is identical to the system 210 of the embodiment of FIG. 3 in all respects with the exception of the following: the system 310 additionally includes an external head-end in-flight-entertainment (IFE) system 332A, and internal in-flight-entertainment (IFE) units 332B, 332C, and 332D; and the additional internal in-flight-entertainment units 332B, 332C, and 332D communicate with one another, communicate with the additional external head-end in-flight entertainment unit 332A, and communicate with the passenger control units 24A, 24D, 24G, 24J, 24M, 24P, 24S, 24V, and 24Y. The system 310 creates a dynamic, real-time database, which allows passenger control units to control their associated passenger service units, in the same manner as the system 210 of FIG. 3 without using or needing the external head-end in-flight entertainment unit 332A, or the internal in-flight-entertainment units 332B, 332C, and 332D. In additional embodiments, other types of systems or devices may be in communication with the system 310.

Figure 5:
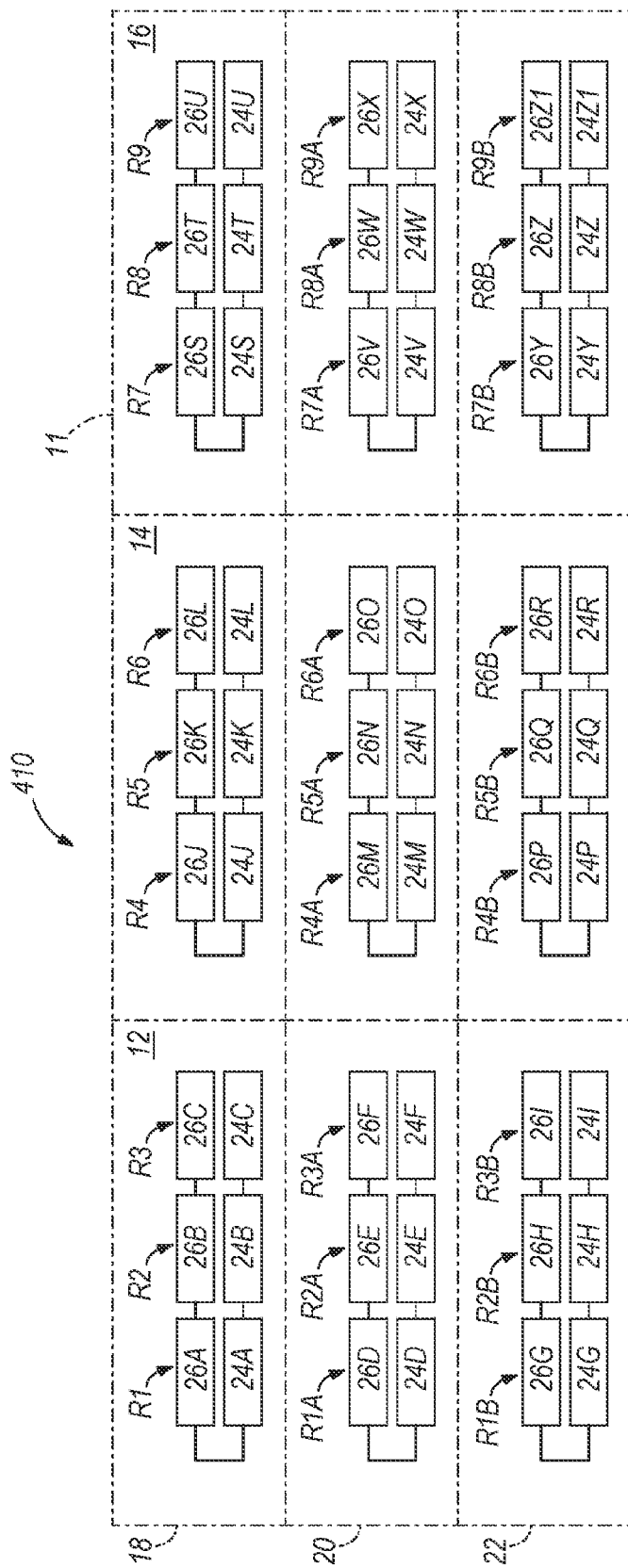
FIG. 5 is a box diagram illustrating an additional embodiment of a system.

FIG. 5 is a box diagram illustrating another embodiment of a system 410. The system 410 is identical to the system 210 of the embodiment of FIG. 3 in all respects with the exception of the following: the zones 12, 14, and 16 have intrinsic cabin management units where the role of generating the database and linking pairs of passenger control units and passenger service units is executed by one of the passenger control units or passenger services units; and, in each separate column 18, 20, and 22 of zones 12, 14, and 16, the passenger control units communicate with the passenger service units without any intermediary units to dynamically make their linkage to allow the passenger control units to control their respective passenger service units.

For instance, passenger control unit 24A communicates directly with passenger service unit 26A to dynamically link passenger control unit 24A to passenger service unit 26A, passenger control unit 24B to passenger service unit 26B, and passenger control unit 24C to passenger service unit 26C. Passenger control unit 24D communicates directly with passenger service unit 26D to dynamically link passenger control unit 24D to passenger service unit 26D, passenger control unit 24E to passenger service unit 26E, and passenger control unit 24F to passenger service unit 26F. Passenger control unit 24G communicates directly with passenger service unit 26G to dynamically link passenger control unit 24G to passenger service unit 26G, passenger control unit 24H to passenger service unit 26H, and passenger control unit 24I to passenger service unit 26I. Passenger control unit 24J communicates directly with passenger service unit 26J to dynamically link passenger control unit 24J to passenger service unit 26J, passenger control unit 24K to passenger service unit 26K, and passenger control unit 24L to passenger service unit 26L. Passenger control unit 24M communicates directly with passenger service unit 26M to dynamically link passenger control unit 24M to passenger service unit 26M, passenger control unit 24N to passenger service unit 26N, and passenger control unit 24O to passenger service unit 26O. Passenger control unit 24P communicates directly with passenger service unit 26P to dynamically link passenger control unit 24P to passenger service unit 26P, passenger control unit 24Q to passenger service unit 26Q, and passenger control unit 24R to passenger service unit 26R. Passenger control unit 24S communicates directly with passenger service unit 26S to dynamically link passenger control unit 24S to passenger service unit 26S, passenger control unit 24T to passenger service unit 26T, and passenger control unit 24U to passenger service unit 26U. Passenger control unit 24V communicates directly with passenger service unit 26V to dynamically link passenger control unit 24V to passenger service unit 26V, passenger control unit 24W to passenger service unit 26W, and passenger control unit 24X to passenger service unit 26X. Passenger control unit 24Y communicates directly with passenger service unit 26Y to dynamically link passenger control unit 24Y to passenger service unit 26Y, passenger control unit 24Z to passenger service unit 26Z, and passenger control unit 24Z1 to passenger service unit 26Z1.

In other embodiments, a varying number of passenger control units, and a varying number of passenger service units may be used to dynamically link each passenger control unit to a separate passenger control unit using varying communication configurations. In additional embodiments, other types of systems or devices may be in communication with the system 410.

Figure 6:
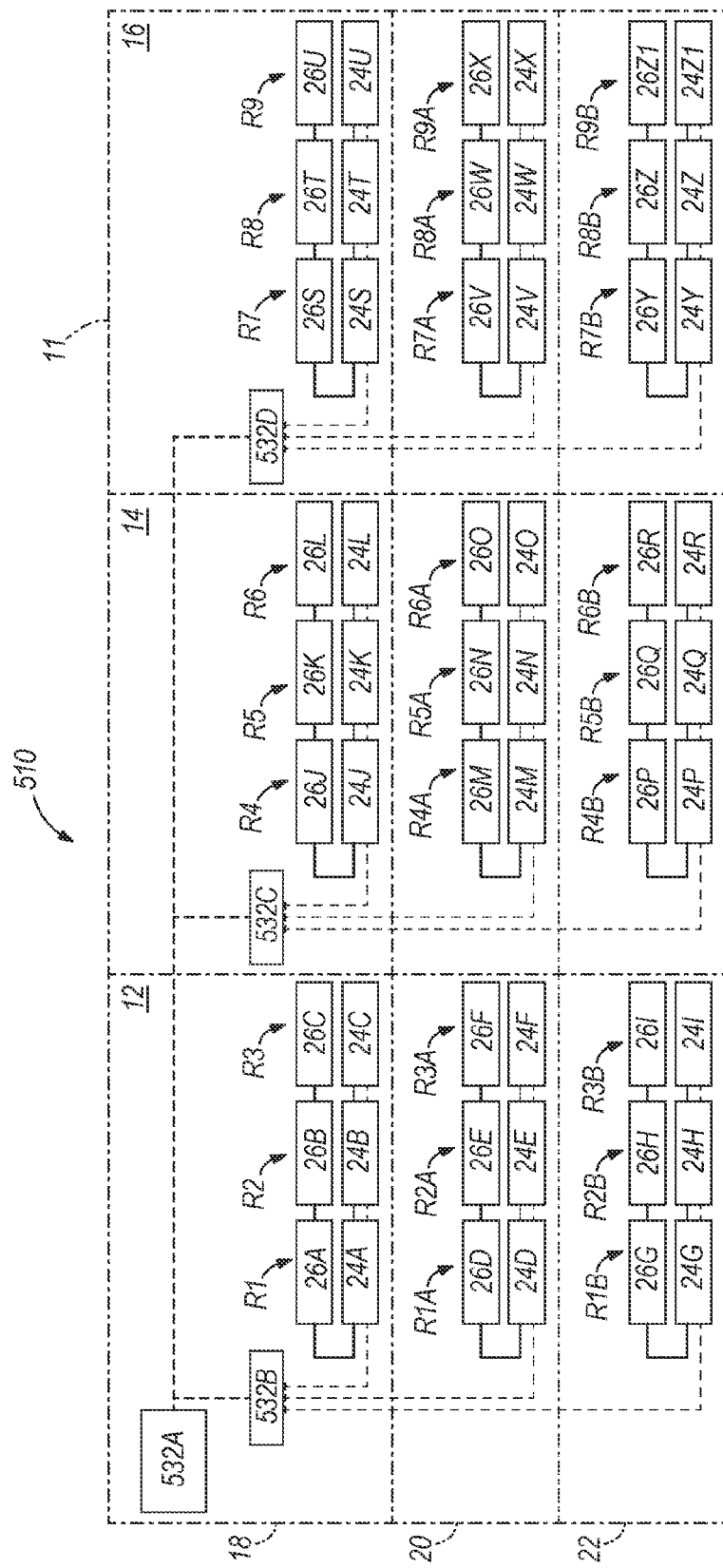
FIG. 6 is a box diagram illustrating yet another embodiment of a system.

FIG. 6 is a box diagram illustrating another embodiment of a system 510. The system 510 is identical to the system 410 of the embodiment of FIG. 5 in all respects with the exception of the following: the system 510 additionally includes an external head-end in-flight-entertainment (IFE) unit 532A, and internal in-flight-entertainment (IFE) units 532B, 532C, and 532D; and the additional internal in-flight-entertainment units 532B, 532C, and 532D communicate with one another, communicate with the additional external head-end in-flight entertainment unit 532A, and communicate with the passenger control units 24A, 24D, 24G, 24J, 24M, 24P, 24S, 24V, and 24Y. The system 510 creates a dynamic, real-time database, which allows passenger control units to control their associated passenger service units, in the same manner as the system 410 of FIG. 5 without using or needing the external head-end in-flight entertainment unit 532A, or the internal in-flight-entertainment units 532B, 532C, and 532D. In additional embodiments, other types of systems or devices may be in communication with the system 510.

Figure 7:
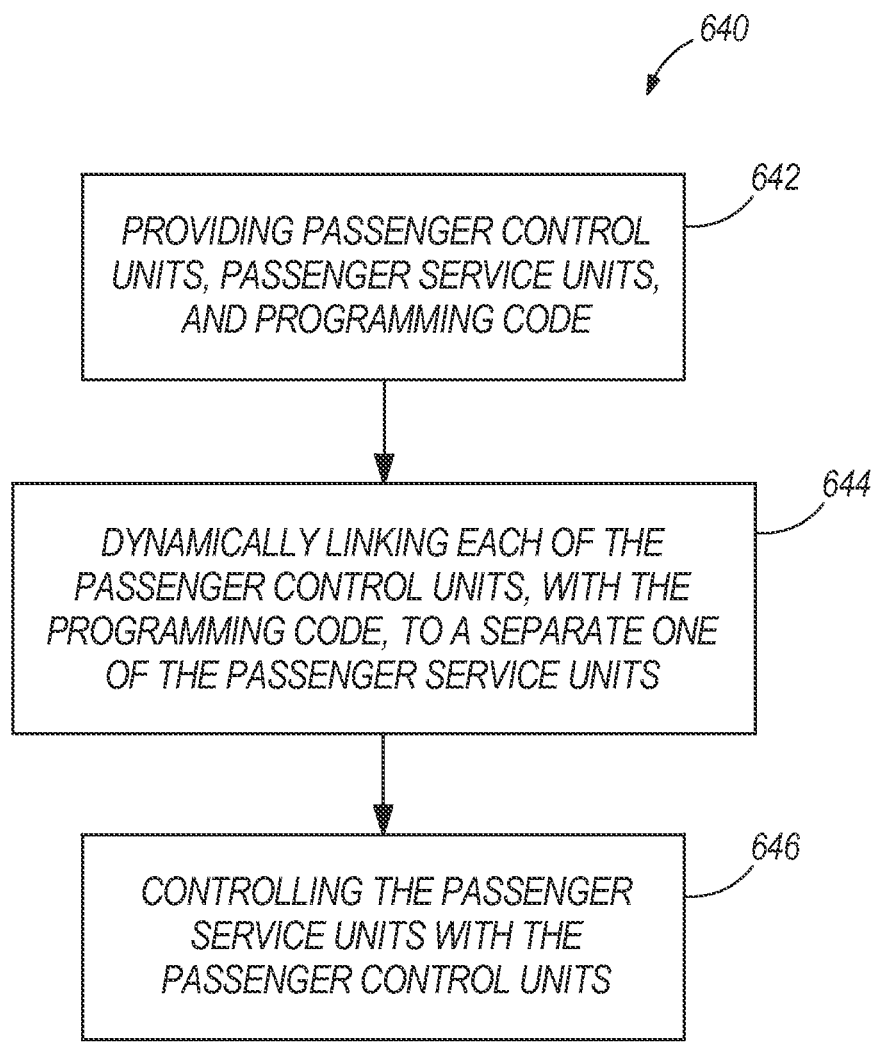
FIG. 7 is a flowchart illustrating one embodiment of a method of managing a passenger cabin.

FIG. 7 is a flowchart illustrating one embodiment of a method 640 of managing a passenger cabin. In step 642, a plurality of passenger control units, a plurality of passenger service units, and a programming code stored on a computer readable medium are provided. In step 644, each of the passenger control units are dynamically linked, with the programming code, to a separate one of the passenger service units. In step 646, the passenger service units are controlled with the passenger control units.

In one embodiment, step 642 may further comprise providing a cabin management unit, and step 644 may further comprise the passenger control units communicating with the cabin management unit, and the cabin management unit communicating with the passenger service units.

In another embodiment, step 642 may further comprise providing a plurality of columns with each of the columns comprising a plurality of rows of at least one seat. Each seat of each row of each column may be associated with a separate one of the passenger control units, and each row may be associated with a separate one of the passenger service units. In this same embodiment, step 644 may further comprise the cabin management unit communicating with the passenger control units and the passenger service units of all of the columns.

In still another embodiment, step 642 may further comprise providing a plurality of columns and a plurality of cabin management units. Each of the columns may comprise a plurality of rows. Each of the rows may comprise at least one seat. Each seat of each row of each column may be associated with a separate one of the passenger control units. Each row of each column may be associated with a separate one of the passenger service units. In this same embodiment, step 644 may further comprise each of the cabin management units communicating with the passenger control units and the passenger service units of only one of the columns.

In yet another embodiment, step 644 may further comprise the passenger control units communicating with one another, one of the passenger control units communicating directly with one of the passenger service units, and the passenger service units communicating with one another.

In an additional embodiment, step 644 may further comprise dynamically determining, with the programming code, a first quantity of the passenger control units, a second quantity of the passenger service units, and creating, with the programming code, a dynamic database comprising the passenger control units each dynamically linked to the separate one of the passenger service units.

One or more embodiments of the disclosure reduce one or more issues experienced by the existing systems and methods by providing a self-configuring, dynamic system that links passenger control units to passenger service units, allowing passengers to control the functions of the passenger service units with the associated passenger control units, without requiring a custom, static database for the passenger cabin, such as a pre-configured specific layout of a passenger area (LOPA) for the linkage. This eliminates the need for a custom database to be manually generated using a CMS database generator for a cabin management system, and eliminates the need for a corresponding overhead typically required to generate, maintain, and deploy the database. It also eliminates the need for an in-flight-entertainment system (IFE) to be present for communication to take place between passenger control units and passenger service units. This saves time because a database does not have to be pre-generated, and saves money because a configuration management system is not needed to track revisions of the database, and a mechanism to deploy the database is not needed. Furthermore, such a system saves more weight than typical systems, allowing for cost savings in fuel for vehicles implementing the system.

It should be understood, of course, that the foregoing relates to exemplary embodiments of the disclosure and those modifications may be made without departing from the spirit and scope of the disclosure as set forth in the following claims.

I claim:

1. A passenger cabin system comprising:
   a plurality of passenger control units through which passenger input can be received,
   a plurality of passenger service units, each configured to perform a function based on an input command received from one of the plurality of passenger control units,
   one or more computer processors; and
   a programming code, stored on a non-transitory computer readable medium, that when executed by operation of the one or more computer processors, enables the passenger control units, the passenger service units, or a cabin management unit to on their own, create a dynamic database dynamically linking at least one of the passenger control units to a separate one of the passenger service units without the assistance of an in-flight entertainment system or an external passenger flight information system, comprising:
   determining how many control units of the plurality of passenger control units are disposed within a zone of the passenger cabin system;
   determining how many service units of the plurality of passenger service units are disposed within the zone of the passenger cabin system; and
   creating a database linking each control unit within the zone of the passenger cabin system to a corresponding service unit within the zone, facilitating direct communication between each of the plurality of passenger control units and the linked passenger service unit.

2. The passenger cabin system of claim 1 further comprising the cabin management unit, the passenger control units being configured to communicate with the cabin management unit which is configured to communicate with the passenger service units.

3. The passenger cabin system of claim 2 further comprising a plurality of columns, with each of the columns comprising a plurality of rows, with each row having at least one seat, with each seat of each row of each column being associated with a separate one of the passenger control units, with each row being associated with a separate one of the passenger service units, and the cabin management unit being configured to communicate with the passenger control units and the passenger service units of all of the columns.

4. The passenger cabin system of claim 2 further comprising a plurality of columns and a plurality of cabin management units, each of the columns comprising a plurality of rows, with each row having at least one seat, with each seat of each row of each column being associated with a separate one of the passenger control units, with each row being associated with a separate one of the passenger service units, and each of the cabin management units being configured to communicate with the passenger control units and the passenger service units of only one of the columns.

5. The passenger cabin system of claim 1 in which the passenger control units are configured to communicate with one another, one of the passenger control units is configured to communicate directly with one of the passenger service units, and the passenger service units are configured to communicate with one another.

6. The passenger cabin system of claim 1 with the passenger control units comprising passenger controls which are configured to control the passenger service units.

7. The passenger cabin system of claim 1 with the passenger control units comprising at least one of an assistance call control or a light control, and the passenger service units comprising at least one of a light or a display.

8. The passenger cabin system of claim 1 wherein the passenger control units are self-configured to, using the programming code, on their own create the dynamic database dynamically linking the at least one passenger control unit to the separate one of the passenger service units.

9. The passenger cabin system of claim 1 wherein the passenger service units are self-configured to, using the programming code, on their own create the dynamic database dynamically linking the at least one passenger control unit to the separate one of the passenger service units.

10. The passenger cabin system of claim 1 wherein the cabin management unit is self-configured to, using the programming code, on their own create the dynamic database dynamically linking the at least one passenger control unit to the separate one of the passenger service units.

11. The passenger cabin system of claim 1 wherein the passenger service units comprise over-head units.

12. The passenger cabin system of claim 1 wherein the passenger service units comprise lights, displays, fans, or air devices.

13. A vehicle comprising:
    at least one column comprising a plurality of rows, each row comprising at least one seat;
    a plurality of passenger control units through which passenger input can be received, each seat of each row being associated with a separate one of the passenger control units;
    a plurality of passenger service units, each configured to perform a function based on an input command received from one of the plurality of passenger control units, and each of the rows being associated with a separate one of the passenger service units;
    one or more computer processors; and
    a programming code, stored on a non-transitory computer readable medium, that when executed by operation of the one or more computer processors, enables the passenger control units, the passenger service units, or a cabin management unit to, using the programming code, on their own create a dynamic database dynamically linking each of the passenger control units to a separate one of the passenger service units without the assistance of an in-flight entertainment system or an external passenger flight information system, comprising:
    determining how many control units of the plurality of passenger control units are disposed within a zone of the passenger cabin system;
    determining how many service units of the plurality of passenger service units are disposed within the region zone of the passenger cabin system; and
    creating a database linking each control unit within the zone of the passenger cabin system to a corresponding service unit within the zone, facilitating direct communication between each of the plurality of passenger control units and the linked passenger service unit.

14. The vehicle of claim 13 further comprising the cabin management unit, the passenger control units being configured to communicate with the cabin management unit which is configured to communicate with the passenger service units.

15. The vehicle of claim 14 further comprising a plurality of columns with each of the columns comprising the plurality of the rows of the at least one seat, with each seat of each row of each column being associated with a separate one of the passenger control units, with each row being associated with a separate one of the passenger service units, and the cabin management unit being configured to communicate with the passenger control units and the passenger service units of all of the columns.

16. The vehicle of claim 14 further comprising a plurality of columns and a plurality of cabin management units, each of the columns comprising the plurality of the rows of the at least one seat, with each seat of each row of each column being associated with a separate one of the passenger control units, and with each row being associated with a separate one of the passenger service units, and each of the cabin management units being configured to communicate with the passenger control units and the passenger service units of only one of the columns.

17. The vehicle of claim 13 in which the passenger control units are configured communicate with one another, one of the passenger control units is configured to communicate directly with one of the passenger service units, and the passenger service units are configured to communicate with one another.

18. The vehicle of claim 13 with the passenger control units comprising passenger controls which are configured to control the passenger service units.

19. The vehicle of claim 13 with the passenger control units comprising at least one of an assistance call control or a light control, and the passenger service units comprising at least one of a light or a display.

20. The vehicle of claim 13 wherein the passenger control units are self-configured to, using the programming code, on their own create the dynamic database dynamically linking each of the passenger control units to the separate one of the passenger service units.

21. The vehicle of claim 13 wherein the passenger service units are self-configured to, using the programming code, on their own create the dynamic database dynamically linking each of the passenger control unit to the separate one of the passenger service units.

22. The vehicle of claim 13 wherein the cabin management unit is self-configured to, using the programming code, on their own create the dynamic database dynamically linking each of the passenger control unit to the separate one of the passenger service units.

23. A method of managing a passenger cabin comprising:
providing (i) a plurality of passenger control units through which passenger input can be received, (ii) a plurality of passenger service units, each configured to perform a function based on an input command received from one of the plurality of passenger control units; and
creating, by one of the passenger control units, the passenger service units or a cabin management unit, on their own, a dynamic database dynamically linking each of the passenger control units to a separate one of the passenger service units without the assistance of an in-flight entertainment system or an external passenger flight information system, comprising:
determining how many control units of the plurality of passenger control units are disposed within a zone of the passenger cabin system;
determining how many service units of the plurality of passenger service units are disposed within the zone of the passenger cabin system; and
creating a database linking each control unit within the zone of the passenger cabin system to a respective service unit within the zone, facilitating direct communication between each of the plurality of passenger control units and the linked passenger service unit.

24. The method of claim 23 further comprising providing the cabin management unit, and additionally comprising the passenger control units communicating with the cabin management unit, and the cabin management unit communicating with the passenger service units.

25. The method of claim 24 further comprising providing a plurality of columns with each of the columns comprising a plurality of rows, with each row comprising at least one seat, with each seat of each row of each column being associated with a separate one of the passenger control units, and each row being associated with a separate one of the passenger service units, and further comprising the cabin management unit communicating with the passenger control units and the passenger service units of all of the columns.

26. The method of claim 24 further comprising providing a plurality of columns and a plurality of cabin management units, each of the columns comprising a plurality of rows, each row comprising at least one seat, each seat of each row of each column being associated with a separate one of the passenger control units, each row being associated with a separate one of the passenger service units, and further comprising each of the cabin management units communicating with the passenger control units and the passenger service units of only one of the columns.

27. The method of claim 23 further comprising the passenger control units communicating with one another, one of the passenger control units communicating directly with one of the passenger service units, and the passenger service units communicating with one another.

28. The method of claim 23 further comprising controlling the passenger service units with the passenger control units.

29. The method of claim 23 wherein the using the programming code to self-configure and create, on their own, the dynamic database comprises the passenger control units using the programming code to self-configure and create, on their own, the dynamic database linking each of the passenger controls units to the separate one of the passenger service units.

30. The method of claim 23 wherein the using the programming code to self-configure and create, on their own, the dynamic database comprises dynamically linking with the passenger service units using the programming code to self-configure and create, on their own, the dynamic database linking each of the passenger controls units to the separate one of the passenger service units.

31. The method of claim 23 wherein the using the programming code to self-configure and create, on their own, the dynamic database comprises dynamically linking with the cabin management unit using the programming code to self-configure and create, on its own, the dynamic database linking each of the passenger controls units to the separate one of the passenger service units.

* * * * *